(12) United States Patent
Li

(10) Patent No.: US 7,641,720 B2
(45) Date of Patent: Jan. 5, 2010

(54) FLOW TURNING VANE ASSEMBLY WITH INTEGRATED HYDROCARBON ADSORBENT

(75) Inventor: Lei Li, Whitby (CA)

(73) Assignee: GM Global Technology Operations, Inc., Detroit, MI (US)

( * ) Notice: Subject to any disclaimer, the term of this patent is extended or adjusted under 35 U.S.C. 154(b) by 393 days.

(21) Appl. No.: 11/462,849

(22) Filed: Aug. 7, 2006

(65) Prior Publication Data

US 2008/0028938 A1    Feb. 7, 2008

(51) Int. Cl.
*B03C 3/41* (2006.01)

(52) U.S. Cl. .............................. 96/108; 55/378; 95/901; 96/134; 96/152; 96/154; 96/390; 96/392; 96/394

(58) Field of Classification Search .................... 96/394, 96/392, 390, 108, 152, 134, 154; 95/901; 55/378
See application file for complete search history.

(56) References Cited

U.S. PATENT DOCUMENTS

| | | | |
|---|---|---|---|
| 3,006,346 A * | 10/1961 | Golding | 131/332 |
| 4,217,386 A * | 8/1980 | Arons et al. | 428/198 |
| 5,236,478 A * | 8/1993 | Lewis et al. | 55/319 |
| 5,240,610 A * | 8/1993 | Tani et al. | 210/497.1 |
| 5,323,661 A | 6/1994 | Cheng | |
| 5,620,545 A * | 4/1997 | Braun et al. | 156/205 |
| 5,662,079 A | 9/1997 | Snider | |
| 6,623,350 B2 * | 9/2003 | Goupil et al. | 454/158 |
| 6,736,871 B1 | 5/2004 | Green et al. | |
| 6,752,859 B2 | 6/2004 | LaBarge et al. | |

OTHER PUBLICATIONS

The American Heritage Dictionary of the English Language, Fourth Edition (2000).*

* cited by examiner

*Primary Examiner*—Jason M Greene
*Assistant Examiner*—Anthony Shumate

(57) ABSTRACT

The invention concerns a flow turning vane assembly for use in a duct bend portion of a clean air duct of an air induction system for a vehicle engine. The flow turning vane assembly may have a vane support housing, and a hydrocarbon adsorbent vane mounted to the vane support housing. The hydrocarbon adsorbent vane has a curved shape complimentary to the duct bend portion and includes a hydrocarbon adsorbent layer.

20 Claims, 4 Drawing Sheets

FLOW TURNING VANE ASSEMBLY WITH INTEGRATED HYDROCARBON ADSORBENT

BACKGROUND OF THE INVENTION

The present invention relates generally to an air induction system for a vehicle engine and more particularly to flow turning vanes and hydrocarbon adsorbents included in the air induction system.

Motor vehicle manufacturers are continually trying to obtain greater power output from given size engines, even while meeting new environmental emissions and fuel economy requirements. One area of the overall engine system that is being closely scrutinized is the air induction system. This area is being scrutinized because one factor relating to the maximum engine power output is the air flow capacity through the air induction system—the lower the air flow capacity the lower the maximum engine power output. Consequently, the pressure loss of the air induction system must be minimized to provide a desired amount of air flow for maximizing engine power output. However, the emissions and fuel economy requirements are creating the undesired effect of causing more flow restrictions.

An emissions requirement that may have an adverse effect on airflow capacity is a requirement to reduce evaporative hydrocarbon emissions from vehicles. In response to this requirement, hydrocarbon adsorbents have been added in air cleaner housings. The adsorbents reduce hydrocarbon emissions caused by vapors escaping from the air induction system after engine shutdown. That is, when the engine is shut down, residual unburned fuel inside the cylinder head and intake runner evaporates to form hydrocarbon vapor, which flows through the engine throttle body and into the air induction system. Then, hydrocarbons, if not trapped, can leak out into the atmosphere through the air induction system. The hydrocarbon adsorbent traps the hydrocarbon vapor.

There are generally two types of hydrocarbon trapping devices in use—flow-through adsorbents and non-flow-through adsorbents. The non-flow-through adsorbent may include a carbon liner or carbon bag mounted on an internal wall of the air cleaner housing, so the air does not flow through it. A concern with this type of trapping device is that it may have a relatively low adsorbing efficiency, with only a small amount of hydrocarbon molecules being trapped relative to the size of the trap. The flow-through adsorbent, on the other hand, may include a honeycomb carbon adsorbent that is mounted across the duct air passage, or a panel carbon adsorbent that is mounted in the air cleaner housing parallel with the air filter. While this type of hydrocarbon adsorbent generally has higher adsorbing efficiency, it creates a restriction in the air flow path, thereby causing pressure loss. To reduce the pressure losses, the flow-through types may be designed with a large percentage of open area across their faces. But this, then, results in the low adsorbing efficiency that was inherent in the non-flow-through types.

The other type of vehicle requirement—fuel economy—may also lead to air flow restrictions, although indirectly so. To improve fuel economy, vehicles, and especially engine compartments, have been reduced in size. This reduction in size often leads to packaging compromises that require the shape of the air induction system components to be less than ideal for maximum air flow. For example, the inlet air is typically drawn in from a front corner behind a headlamp of the vehicle, where the air is cool and at a relatively high pressure. After passing through the air cleaner, where it is filtered, it is drawn into a clean air duct. The clean air duct typically must turn about 90 degrees—with a sharp radius and short length—to direct flow to a throttle body. The 90-degree bend of the clean air duct causes significant flow recirculation and stagnant flow near the inside of the bend, with a resulting air flow pressure loss in this duct. The air flow pressure loss can lead to a reduction in the maximum engine power output.

In order to overcome this pressure loss, some have located turning vanes at the bend in the clean air duct. Turning vanes, in effect, divide the duct into multiple ducts that have closer to ideal bend radii to duct diameter ratios, and they provide a surface that forces air in the flow stream around the bend. Consequently, a duct having turning vanes in its bend almost fully uses the duct cross section, greatly reducing the pressure drop across the bend. The turning vanes may also help to reduce entrance losses into the throttle body and distribute air equally to all cylinders, with a resulting improved flow performance. Thus, a greater air flow through the air induction system may allow for greater maximum engine power output.

But turning vanes are not commonly used in air induction system because they are typically not cost effective if used only for reducing the pressure loss. In many cases, engineers cannot justify the benefits of turning vanes compared to the cost associated with adding the vanes. So instead, engineers struggle with increasing bend ratios (bend radius/duct diameter) as much as possible. However, due to packaging constraints in the vehicle engine compartment, engineers often come up short of the desired bend ratio and live with the pressure loss caused by the sharp bend in the clean air duct.

SUMMARY OF THE INVENTION

An embodiment contemplates a flow turning vane assembly for use in a duct bend portion of a clean air duct of an air induction system for a vehicle engine. The flow turning vane assembly includes a vane support housing; and a hydrocarbon adsorbent vane mounted to the vane support housing, having a curved shape complimentary to the duct bend portion, adapted to be located in the duct bend portion, and including a hydrocarbon adsorbent layer.

An embodiment contemplates a clean air duct for use in an air induction system for a vehicle engine. The clean air duct including an inlet, an outlet, a passage extending from the inlet to the outlet, a duct bend portion in the passage, and a vane assembly opening extending around at least a portion of the duct bend portion. The clean air duct also includes a flow turning vane assembly including a hydrocarbon adsorbent vane extending through the vane assembly opening and into the duct bend portion of the passage, the hydrocarbon adsorbent vane having a curved shape complimentary to the duct bend portion.

An embodiment contemplates an air induction system for use with a vehicle engine comprising an air cleaner having an inlet and an outlet; and a clean air duct having an inlet connected to the air cleaner outlet, a duct bend portion, and a flow turning vane assembly having a hydrocarbon adsorbent vane located in the duct bend portion, the hydrocarbon adsorbent vane having a curved shape complimentary to the duct bend portion.

An advantage of an embodiment is that the flow turning vane assembly can provide high hydrocarbon trapping capacity during engine shutdown, with low flow restriction (pressure loss) around a bend in a clean air duct during engine operation. Thus, the device functions to simultaneously enhance flow performance and reduce hydrocarbon emission from the air induction system.

An advantage of an embodiment is that the flow turning vane assembly is compact and cost effective since it provides an integrated unit which serves both purposes of providing flow turning and hydrocarbon adsorbing capability. The assembly may also save cost by providing both functions with less manufacturing assembly steps. The assembly is compact, helping with vehicle component packaging, since it is in the duct and does not take up extra engine compartment space.

An advantage of an embodiment is that the flow turning vane assembly can be located at the duct bend section, where the assembly may have the most benefit—higher adsorbing efficiency and lower pressure loss.

DETAILED DESCRIPTION

Figure 1:
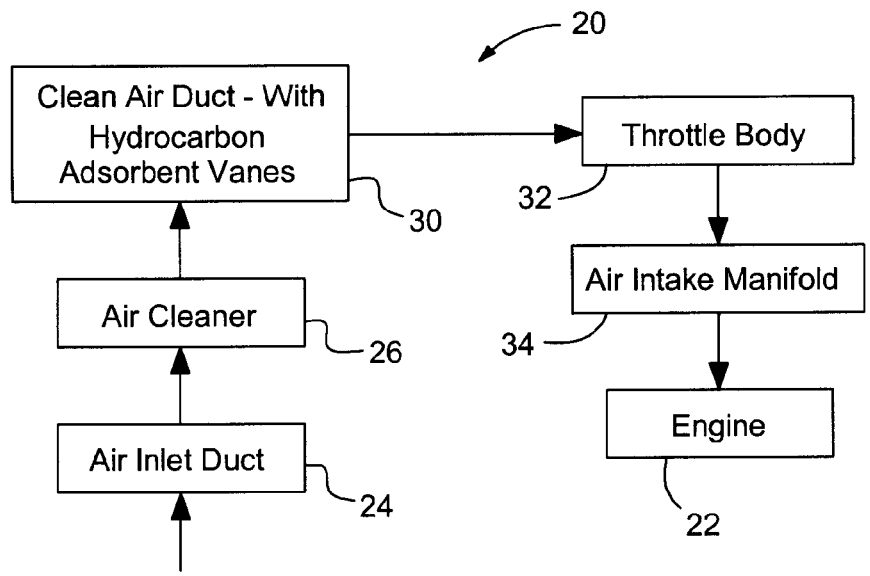
FIG. 1 is a block diagram of an air induction system leading to a vehicle engine.
Figure 2:
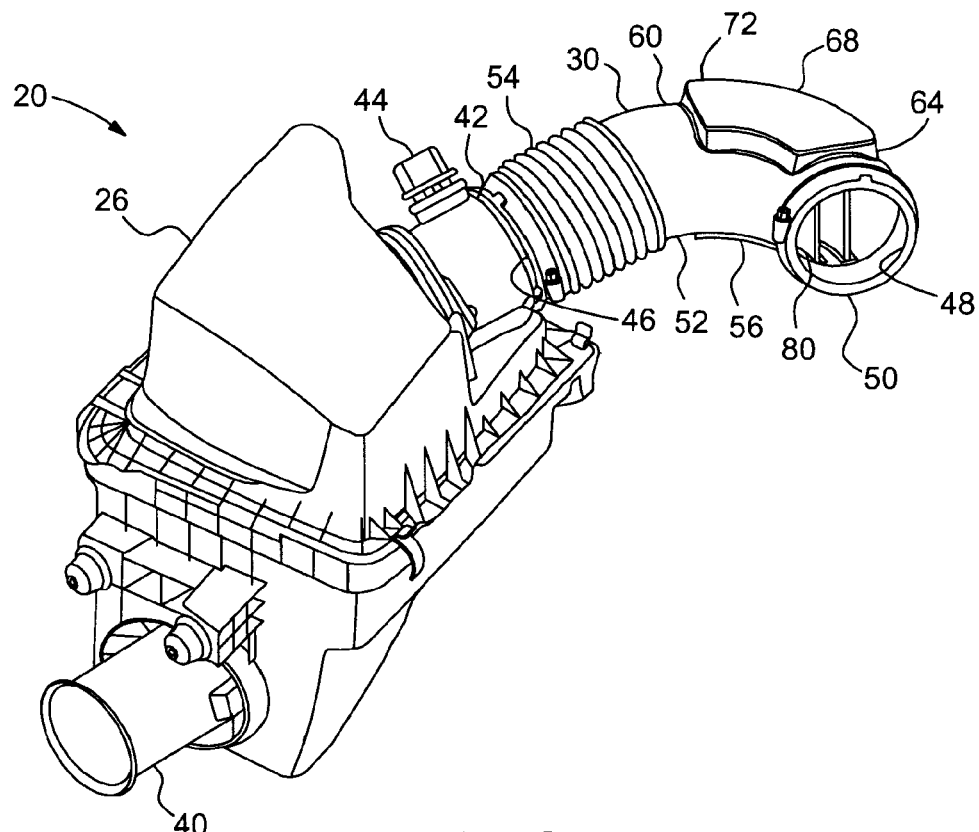
FIG. 2 is a perspective view of an air induction system according to a first embodiment.
Figure 3:
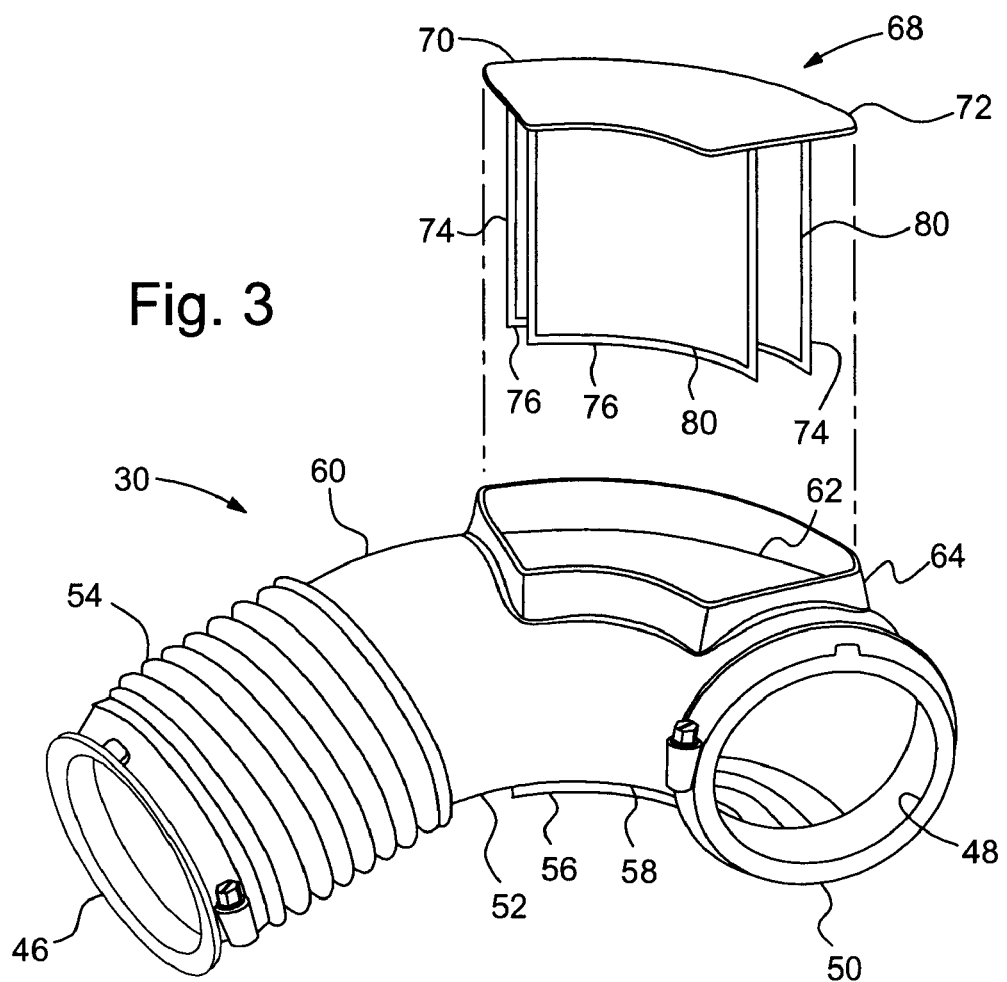
FIG. 3 is a partially exploded, perspective view, on an enlarged scale, of the clean air duct assembly portion of the air induction system of FIG. 2.
Figure 4:
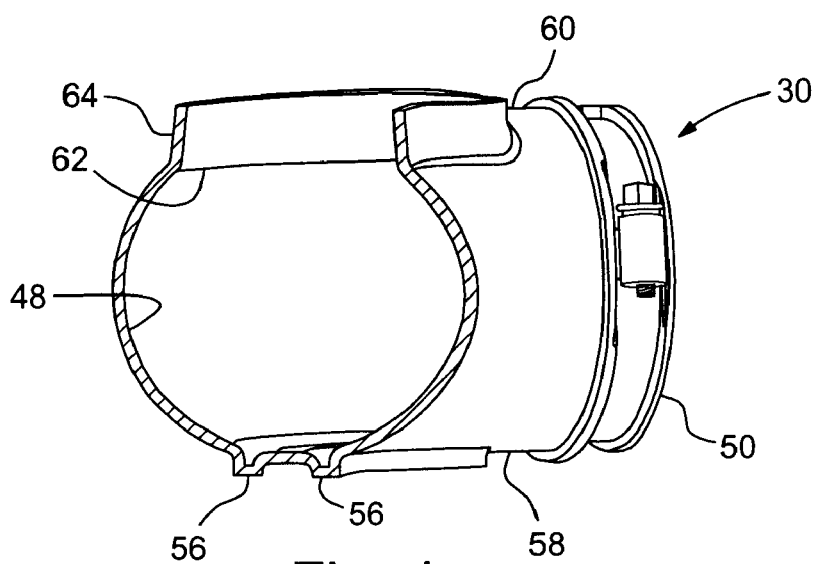
FIG. 4 is a sectional view, on an enlarged scale, of the clean air duct of FIG. 3.
Figure 5:
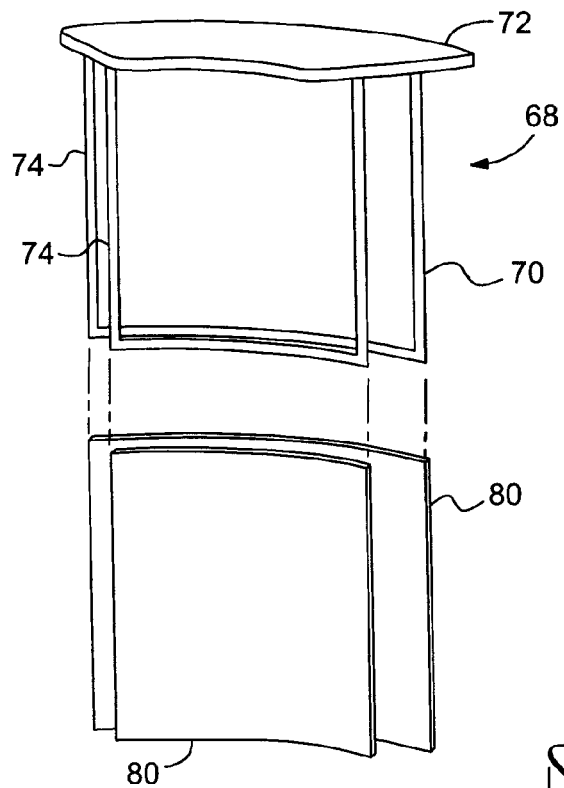
FIG. 5 is partially exploded, perspective view, on an enlarged scale, of the flow turning vane assembly portion of the clean air duct assembly of FIG. 3.

FIG. 1 shows a block diagram of an air induction system 20 directing air to a vehicle engine 22. The air induction system 20 includes an inlet duct 24 that opens to the atmosphere and directs flow into an air cleaner 26, where the air is filtered. A clean air duct 30 is in fluid communication with an outlet of the air cleaner 26. The clean air duct 30 includes a flow turning vane assembly with hydrocarbon adsorbent vanes, which will be discussed in more detail below. The clean air duct directs air to a throttle body 32 (either directly or through another duct). The throttle body 32 is in fluid communication with an air intake manifold 34. The air intake manifold 34, in turn, directs the air to intake valves (not shown) of the engine 22.

FIGS. 2-5 illustrate a portion of the air induction system 20 of FIG. 1 in more detail, according to a first embodiment. An inlet 40 directs air into the air cleaner 26, with the air flowing through an air filter (not shown) before flowing out through an outlet 42 of the air cleaner 26, past a mass air flow sensor 44. These components may be conventional, and so will not be discussed or shown in more detail herein.

The mass air flow sensor 44 is adjacent to an inlet 46 to the clean air duct 30. A passage 48 extends through the clean air duct 30 from the inlet 46 to an outlet 50. Between the inlet 46 and outlet 50 is a duct bend portion 52, in which the duct 30 curves to change the direction of air flow. The clean air duct 30 may include an accordion-type portion 54 near the inlet 46, which allows the duct 30 to flex when the air cleaner 26 is partially disassembled to replace an air filter (not shown). Along the bottom 58 of the clean air duct 30, generally in the duct bend portion 52, may be a pair of vane support grooves 56. The grooves 56 may be employed to positively position and support a flow turning vane assembly 68, discussed below. In the top 60 of the duct 30, generally in the duct bend portion 52, may be a vane assembly opening 62. A vane assembly mounting flange 64 may surround and extend upward from the vane assembly opening 62, for receiving and sealing against the flow turning vane assembly 68. Of course, the grooves 56 and opening 62 may be in the reverse positions, top and bottom, if so desired.

The flow turning vane assembly 68 includes a vane support housing 70. The vane support housing 70 includes a cap 72, which is sized and shaped to mate in sealing engagement with the vane assembly mounting flange 64, and a pair of frames 74, which each extend downward from the cap 72 and have a bottom portion 76 that is shaped to be received in a respective one of the vane support grooves 56. The vane support housing 70 may be injection molded, with the frames 74 and the cap 72 integral. It may be made from polypropylene, or another suitable material. Alternatively, the vane support housing 70 may include reinforcing ribs (not shown), to provide reinforcement to hydrocarbon adsorbent vanes 80 (discussed below) and reduce the risk of buckling when subjected to a high air flow rate. As another alternative, the vane support housing 70 may be an assembly, containing a wire mesh (not shown), made of metal, plastic, or other suitable material, which is permanently bonded to the frames 74. The wire mesh may provide support to reduce the risk that the hydrocarbon adsorbent vanes 80 will buckle when subjected to a high air flow rate.

The flow turning vane assembly 68 also includes the pair of hydrocarbon adsorbent vanes 80. Each of the hydrocarbon adsorbent vanes 80 may be permanently mounted to a respective one of the frames 74 by over molding, injection molding, heat staking, press-fit, snap-fit, gluing, or other suitable process. Each of the hydrocarbon adsorbent vanes 80 has the shape complimentary to the curvature of the duct bend portion 52, with the frames 74 providing rigidity to help hold the hydrocarbon adsorbent vanes 80 in the desired curved shape. The curvature of each of the hydrocarbon adsorbent vanes 80 may be concentric with the duct bend portion 52. The lengths and angles of the hydrocarbon adsorbent vanes 80 are parameters that may be varied during the development of a particular air induction system 20 in order to achieve the desired performance levels of hydrocarbon-capturing efficiency and air flow pressure loss.

The layer or layers of material in each of the hydrocarbon adsorbent vanes 80 may vary depending upon the desired method of construction, cost, performance, or other factors. For example, in this first embodiment, each of the hydrocarbon adsorbent vanes 80 is made up of a laminate activated carbon liner, which adsorbs hydrocarbon molecules. The laminated carbon liner is pliable so that it can be shaped to match the curvature of the duct bend portion 52. It may be made of polypropylene fiber, or other suitable material, and activated carbon granules, with the polypropylene fiber heated to bond with the carbon granules. Such a laminated carbon liner provides adequate stiffness and strength to maintain the curvature of the hydrocarbon adsorbent vane 80 under a high rate of air flow. The hydrocarbon adsorbent vanes 80 may be made by injection molding, compression molding, sintering, hot forging, cold forging, extruding, or other suitable process. After forming, the hydrocarbon adsorbent vanes 80 may be installed and sealed to the vane support housing 70 by over molding, heat staking, press-fit, snap-fit, gluing, or other suitable process. The frames 74 provide rigidity to help maintain the desired curvature for the hydrocarbon adsorbent vanes 80.

The flow turning vane assembly 68 is assembled to the clean air duct 30 by sliding the frames 74 and hydrocarbon adsorbent vanes 80 into the vane assembly opening 62 until each of the frames 74 is received in respective vane support grooves 56. As the frames 74 slide into the grooves 56, the cap 72 comes into contact with the vane assembly mounting flange 64. The grooves 56 and mounting flange 64 assure that the flow turning vane assembly 68 is correctly positioned and oriented in the clean air duct 30. The cap 72 is secured and sealed to the vane assembly mounting flange 64. It may be secured by vibration welding, infra red welding, hot plate welding, or other suitable means. Alternatively, the cap 72 may be attached to the clean air duct 30 using fasteners (not shown) and a gasket (not shown). While fasteners and a gasket may be more expensive than welding, it allows for easier access for servicing.

The operation of the air induction system 20 as it relates to operation of the engine 22 will be discussed relative to FIGS. 1-5. When the engine 22 is shut down, after operating for a while, residual liquid fuel inside the engine evaporates to form hydrocarbon molecules (vapor), which exit the engine 22 through the throttle body 32, and waft into the passage 48 of the clean air duct 30. The hydrocarbon molecules in this vapor must pass by the flow turning vane assembly 68—through the duct bend portion 52—before reaching and dispersing into the atmosphere. The hydrocarbon adsorbent vanes 80 interfere with the hydrocarbon molecules being able to travel on a direct path to atmosphere. Instead, the molecules encounter the curved surfaces of the vanes 80, which contain the hydrocarbon adsorbent medium. The hydrocarbon adsorbent medium of the vanes 80 forms a chemical bond with the hydrocarbon molecules, trapping them.

When the engine 22 is restarted, the flow turning vane assembly 68 performs two functions. First, the incoming atmospheric air flowing through the air induction system 20 passes over the surfaces of the vanes 80, liberating the hydrocarbon molecules from the adsorbing medium and carrying them into the engine 22, where they are consumed in the combustion process. Second, the hydrocarbon adsorbent vanes 80, in effect, divide the passage 48 in the duct bend portion 52 into multiple passages that have more ideal bend radii to duct diameter ratios and provide surfaces that force air in the flow stream around the bend. Consequently, this air flow stream more fully uses the duct cross section, greatly reducing the pressure drop through the duct bend portion 52.

Figure 6:
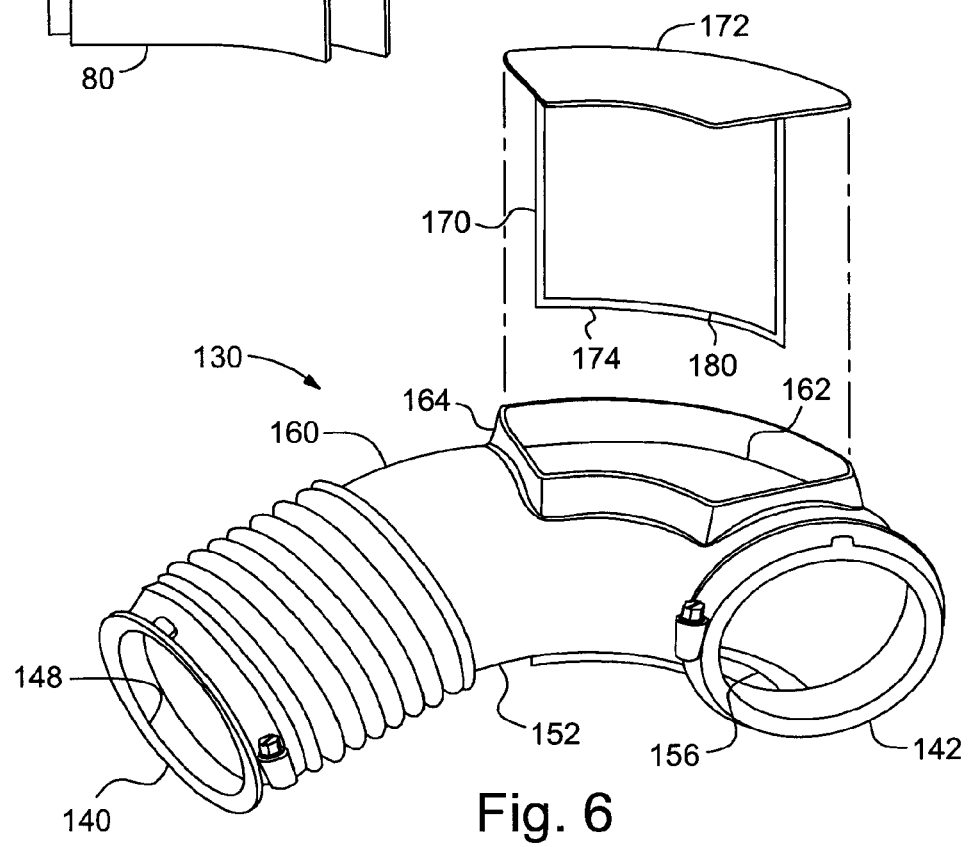
FIG. 6 is a view similar to FIG. 3, but illustrating a second embodiment.

FIG. 6 illustrates a second embodiment. In this embodiment, elements similar to those in the first embodiment will be similarly designated, but employing 100-series numbers. The clean air duct 130 still includes an inlet 140 and an outlet 142, with a passage 148 extending therebetween where air flow is directed through a duct bend portion 152. The top 160 of the duct 130 still includes a vane assembly opening 162 with a vane assembly mounting flange 164 therearound. But in the duct bend portion 152, the bottom of the duct 130 includes only one vane support groove 156. Also, the vane support housing 170 includes a cap 172, but only one frame 174 for supporting a single hydrocarbon adsorbent vane 180. The frame 174 is sized and oriented to mate with the single groove 156. While this embodiment, with only a single vane 180, is less costly of an assembly than the first embodiment, there is less surface area for adsorbing hydrocarbons and one less vane 180 for re-directing air flow to reduce pressure loss. As another alternative, the assembly could have three or more vanes in the duct bend, if so desired.

Figure 7:
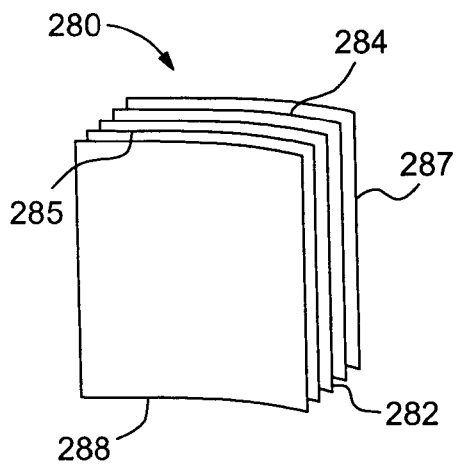
FIG. 7 is a schematic view of the hydrocarbon adsorbent vane according to a third embodiment.

FIG. 7 illustrates a third embodiment. In this embodiment, an alternative construction of a hydrocarbon adsorbent vane 280 is disclosed. The vane 280 is an assembly, made up of multiple layers, suitably secured together to prevent de-lamination, and containing a granulated hydrocarbon adsorbent medium. An example of such a construction may include a first layer 282 of loose granules of hydrocarbon adsorbent medium, and a second layer 284 and a third layer 285 of a polymer fiber or open-cell foam pad on either side of the first layer 282 in order to retain the granules. Then a fourth layer 287 and a fifth layer 288 comprised of a metal screen or mesh are mounted on the outer surfaces of the second and third layers 284, 285, respectively, to retain them. The hydrocarbon adsorbent vane 280 may then be installed and sealed inside the support housing in a manner similar to that described in the first embodiment. One will note that, in this embodiment, hydrocarbon vapors and some of the air actually flow through the interior of the vane 280, as well as flowing over the surface of the vane 280, which may reduce air flow restriction and increase hydrocarbon capturing efficiency.

Figure 8:
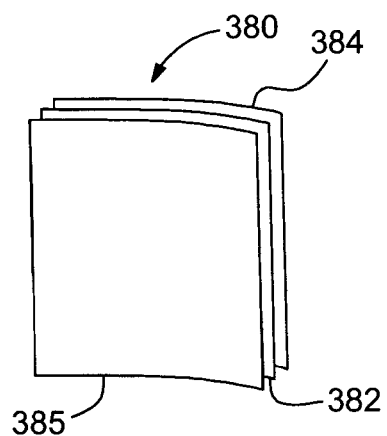
FIG. 8 is a schematic view of the hydrocarbon adsorbent vane according to a fourth embodiment.

FIG. 8 illustrates a fourth embodiment. In this embodiment, another alternative construction of a hydrocarbon adsorbent vane 380 is disclosed. The vane 380 is an assembly containing a hydrocarbon adsorbent medium which is woven into a fine mesh, flexible fabric, with multiple layers suitably secured together to prevent de-lamination. An example of such a construction may include a first layer 382 of a woven, flexible fabric containing hydrocarbon adsorbent medium. A second layer 384 and a third layer 385 of a formed metal or plastic screen or mesh are located on either side of the first layer 382 in order to maintain the turning shape of the vane 380. Optionally, only the second layer 384 or the third layer 385 is employed as a lower cost alternative. The hydrocarbon adsorbent vane 380 may then be installed and sealed inside the support housing in a manner similar to that described in the first embodiment. One will note that, in this embodiment, hydrocarbon vapors and some of the air actually flow through the interior of the vane 380, as well as flowing over the surface of the vane 380, which may reduce air flow restriction and increase hydrocarbon capturing efficiency.

Figure 9:
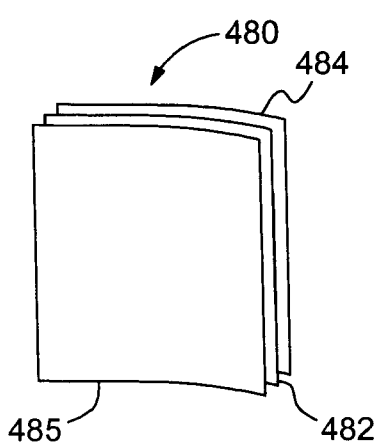
FIG. 9 is a schematic view of the hydrocarbon adsorbent vane according to a fifth embodiment.

FIG. 9 illustrates a fifth embodiment. In this embodiment, another alternative construction of a hydrocarbon adsorbent vane 480 is disclosed. The vane 480 is a composite construction, containing a granulated hydrocarbon adsorbent medium permanently bonded to a rigid carrier piece. An example of such a construction may include a first layer 482, being a rigid carrier piece, that is formed as a curved plate with the desired vane curvature by injection molding, blow molding, compression molding, sintering, hot forging, cold forging, extruding, or other suitable process. A second layer 484 and a third layer 485 of granulated hydrocarbon adsorbent medium are firmly bonded to the opposed surfaces of the first layer 482 using glue or epoxy, creating a surface structure much like that of coarse, double-sided sand paper. The exposed surface of each granule above the glue line is sufficient to trap and release hydrocarbon molecules, while the surface of each granule below the glue line provides a robust attachment of the granule to the first layer 482, thus preventing granule dislodgment. Optionally, the granules of the second and third layers 484, 485 may be attached to the first layer 482 by welding or surface melting of the first layer 482 as a possibly lower cost alternative. The hydrocarbon adsorbent vane 480 may then be installed and sealed inside the support housing in a manner similar to that described in the first embodiment.

Figure 10:
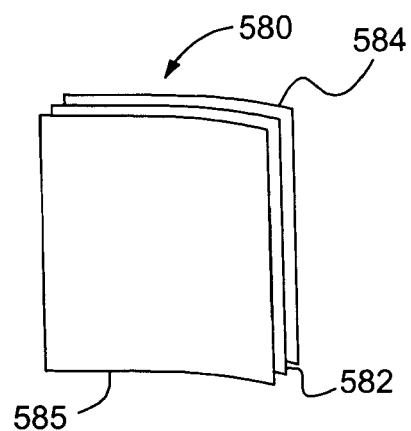
FIG. 10 is a schematic view of the hydrocarbon adsorbent vane according to a sixth embodiment.

FIG. 10 illustrates a sixth embodiment. In this embodiment, another alternative construction of a hydrocarbon adsorbent vane 580 is disclosed. The vane 580 is an assembly including a hydrocarbon adsorbent medium that is deposited onto a woven, open mesh. An example of such a construction may include a first layer 582 being an open mesh screen, made of metal, plastic, or other suitable material, that is shaped with the desired curvature of the vane 580. A second layer 584 and a third layer 585 of granulated hydrocarbon adsorbent medium are firmly bonded to the opposed surfaces of the first layer 582 using glue, epoxy, welding by heat, sintering, or other suitable process. The hydrocarbon adsorbent vane 580 may then be installed and sealed inside the support housing in a manner similar to that described in the first embodiment. One will note that, in this embodiment, hydrocarbon vapors and some of the air actually flow through the interior of the vane 580, as well as flowing over the surface of the vane 580, which may reduce air flow restriction and increase hydrocarbon capturing efficiency.

While certain embodiments of the present invention have been described in detail, those familiar with the art to which this invention relates will recognize various alternative designs and embodiments for practicing the invention as defined by the following claims.

What is claimed is:

1. A flow turning vane assembly for use in a duct bend portion of a clean air duct of an air induction system for a vehicle engine, the flow turning vane assembly comprising:
    a vane support housing; and
    a hydrocarbon adsorbent vane mounted to the vane support housing, the hydrocarbon adsorbent vane being a curved sheet having a shape that is curved in only one direction, the shape defining a portion of an outer side surface of a cylinder that is less than one hundred eighty degrees around the cylinder, the curvature configured to extend along the duct bend portion, and configured to be located in the duct bend portion with the curvature of the hydrocarbon adsorbent vane in a direction of air flow through the duct bend portion to allow a portion of the air to flow through the duct bent portion without flowing through the hydrocarbon adsorbent vane, and the hydrocarbon adsorbent vane including a hydrocarbon adsorbent layer.

2. The flow turning vane assembly of claim 1 including a second hydrocarbon adsorbent vane mounted to the vane support housing in spaced relationship to the hydrocarbon adsorbent vane, the second hydrocarbon adsorbent vane having a curved shape extending along the duct bend portion, configured to be located in the duct bend portion with the curvature of the second hydrocarbon adsorbent vane in a direction of the air flow through the duct bend portion, and including a hydrocarbon adsorbent layer.

3. The flow turning vane assembly of claim 1 wherein the vane support housing includes a cap adapted to mount, in sealing engagement, to the clean air duct.

4. The flow turning vane assembly of claim 1 wherein the vane support housing includes a frame extending around a perimeter of and supporting the hydrocarbon adsorbent vane.

5. The flow turning vane assembly of claim 1 wherein the hydrocarbon adsorbent layer of the hydrocarbon adsorbent vane is a polypropylene fiber liner and activated carbon granules bonded to the polypropylene fiber liner.

6. The flow turning vane assembly of claim 1 wherein the hydrocarbon adsorbent layer is hydrocarbon adsorbent granules, and the hydrocarbon adsorbent vane includes a second layer and a third layer mounted on opposed sides of the hydrocarbon adsorbent layer to retain the hydrocarbon adsorbent granules, a fourth layer mounted adjacent to the second layer, and a fifth layer mounted adjacent to the third layer.

7. The flow turning vane assembly of claim 6 wherein the second and third layers are one of a polymer fiber and an open-cell foam, and the fourth and fifth layers are one of a metal screen and a mesh.

8. The flow turning vane assembly of claim 1 wherein the hydrocarbon adsorbent layer is a woven, flexible hydrocarbon adsorbent fabric, and the hydrocarbon adsorbent vane includes a second layer mounted adjacent to the hydrocarbon adsorbent layer, the second layer being one of a screen and mesh.

9. The flow turning vane assembly of claim 8 wherein the hydrocarbon adsorbent vane includes a third layer mounted adjacent to the hydrocarbon adsorbent layer in opposed relation to the second layer, the third layer being one of a screen and a mesh.

10. The flow turning vane assembly of claim 1 wherein the hydrocarbon adsorbent layer is made up of a rigid carrier piece formed with the curved shape and a granulated hydrocarbon adsorbent medium adhered to the rigid carrier piece.

11. The flow turning vane assembly of claim 1 wherein the hydrocarbon adsorbent layer is made up of one of an open mesh and screen having the curved shape and a granulated hydrocarbon adsorbent medium adhered to the one of the open mesh and screen.

12. A clean air duct for use in an air induction system for a vehicle engine, the clean air duct comprising:
    an inlet configured to receive air flow from an air cleaner;
    an outlet at an opposed end of the air duct from the inlet;
    a wall defining a passage extending from the inlet to the outlet and configured to direct air flow from the inlet to the outlet;
    the wall defining a duct bend portion in the passage, the duct bend portion configured to change a direction of the air flow through the passage;
    a vane assembly opening extending through at least a portion of the wall of the duct bend portion; and
    a flow turning vane assembly including a hydrocarbon adsorbent vane extending through the vane assembly opening and into the duct bend portion of the passage, the hydrocarbon adsorbent vane being a sheet that is curved in a direction extending along the duct bend portion in a direction of air flow through the duct bend portion and extending from the vane assembly opening to a portion of the wall opposed to the vane assembly opening, the hydrocarbon adsorbent vane configured to allow a portion of the air flow through the passage to flow between the inlet and the outlet without flowing through the hydrocarbon adsorbent vane.

13. The clean air duct of claim 12 including a vane support groove recessed in the wall extending along the duct bend portion in the direction of the air flow, with the flow turning vane assembly received in and supported by the vane support groove.

14. The clean air duct of claim 12 including a second flow turning vane assembly including a second hydrocarbon adsorbent vane extending through the vane assembly opening and into the duct bend portion of the passage, the second hydrocarbon adsorbent vane having a curved shape that maintains the second hydrocarbon adsorbent vane equidistant from the hydrocarbon adsorbent vane.

15. The clean air duct of claim 12 including a vane assembly mounting flange extending from the wall and surrounding the vane assembly opening, and wherein the flow turning vane assembly includes a cap sealably mounted to the vane assembly mounting flange.

16. The clean air duct of claim 15 wherein the flow turning vane assembly includes a frame extending from the cap, and the hydrocarbon adsorbent vane is mounted to the frame.

17. An air induction system for use with a vehicle engine comprising:
    an air cleaner having an inlet and an outlet; and a clean air duct having an inlet connected to the air cleaner outlet, a duct bend portion, and a flow turning vane assembly having a hydrocarbon adsorbent vane located in the duct bend portion, the hydrocarbon adsorbent vane having curvature in a direction extending along the duct bend portion in a direction of air flow through the duct bend portion.

18. The air induction system of claim 17 wherein the flow turning vane assembly includes a second hydrocarbon adsorbent vane, located in the duct bend portion, and having a curved shape that is concentric with a curvature of the duct bend portion in the direction of air flow through the duct bend portion.

19. The air induction system of claim 18 wherein the clean air duct includes a first vane support groove and a second vane support groove, with the hydrocarbon adsorbent vane mounted in the first vane support groove and the second hydrocarbon adsorbent vane mounted in the second vane support groove.

20. The air induction system of claim 17 wherein the hydrocarbon adsorbent vane includes activated carbon granules.

* * * * *